(12) United States Patent
Cordill et al.

(10) Patent No.: US 11,637,368 B2
(45) Date of Patent: Apr. 25, 2023

(54) PHASED ARRAY PASSBAND CALIBRATION

(71) Applicant: The Boeing Company, Chicago, IL (US)

(72) Inventors: Brian D. Cordill, San Pedro, CA (US); Bader Akbik, Torrance, CA (US); Ron Y. Lee, Palos Verdes, CA (US); Jeffrey J. Calvagna, Rancho Palos Verdes, CA (US); Nikolay A. Angelov, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 644 days.

(21) Appl. No.: 16/516,221

(22) Filed: Jul. 18, 2019

(65) Prior Publication Data

US 2021/0021029 A1   Jan. 21, 2021

(51) Int. Cl.
*H01Q 3/26*   (2006.01)
*H04B 17/12*   (2015.01)

(52) U.S. Cl.
CPC .............. *H01Q 3/267* (2013.01); *H04B 17/12* (2015.01)

(58) Field of Classification Search
CPC ................................ H01Q 3/267; H04B 17/12
See application file for complete search history.

(56) References Cited

U.S. PATENT DOCUMENTS

| | | | | |
|---|---|---|---|---|
| 10,983,193 | B2* | 4/2021 | Lin | G01S 13/003 |
| 11,075,703 | B2* | 7/2021 | Kim | H04B 17/12 |
| 2017/0346575 | A1 | 11/2017 | Tang et al. | |
| 2018/0220007 | A1* | 8/2018 | Sun | G10L 21/0208 |
| 2019/0004139 | A1* | 1/2019 | Zhang | H01Q 1/521 |
| 2020/0351000 | A1* | 11/2020 | Da Silveira | H04B 17/12 |
| 2020/0411981 | A1* | 12/2020 | Kimball | H04B 1/44 |
| 2021/0384624 | A1* | 12/2021 | Abdalla | H04B 17/11 |

OTHER PUBLICATIONS

"Office Action Issued in European Patent Application No. 20176462.8", dated Oct. 30, 2020, 13 Pages.

* cited by examiner

*Primary Examiner* — Janice N Tieu
(74) *Attorney, Agent, or Firm* — Barta, Jones & Foley, PLLC

(57) ABSTRACT

Systems and methods are provided for phased array passband calibration, which permits repeated calibration of the antenna system in the field without a moving far field sensor. An implementation includes an equalization filter coupled to a phased array feed; a calibration probe disposed to couple with an antenna array to transfer radio frequency (RF) energy; a database of probe-to-far-field (FF) transforms having a probe-to-FF transform for each of a plurality of incidence angles; a calibration component operable to: receive calibration probe measurements for a plurality of frequencies; and determine a calculated phased array passband response for at least a first incidence angle, based at least on the calibration probe measurements and a probe-to-FF transform for the first incidence angle; and a filter generation component operable to generate a tuning configuration for the equalization filter, based at least on the calculated phased array passband response.

20 Claims, 10 Drawing Sheets

PHASED ARRAY PASSBAND CALIBRATION

BACKGROUND

Radio frequency (RF) communication and radar systems are typically susceptible to at least some level of frequency-dependent distortion that degrades waveforms, thereby motivating the use of calibration processes that characterize and compensate for the effects of such distortions. In general, it is preferable to limit distortions within the system's operating band, which drives both hardware costs and also a potential need for ongoing characterization cycles when distortions arise from aging effects. Common calibration approaches include characterizing the hardware passband response and then generating an equalization filter with a passband response that is the inverse of the hardware's passband response.

Whereas it is possible for calibration to be relatively straightforward for some single channel and single RF path arrangements, electrically-steerable phased array antennas present challenges. Rather than being single-input, single-output, such phased arrays employ multiple signals for each of the multiple active array elements. Although a single apparent output is manifest at any given observation point, the existence of a continuum of observation points means that a phased array passband response is a continuum, rather than being a single function of frequency.

SUMMARY

The disclosed examples are described in detail below with reference to the accompanying drawing figures listed below. The following summary is provided to illustrate implementations disclosed herein. It is not meant, however, to limit all examples to any particular configuration or sequence of operations.

Some aspects and implementations disclosed herein are directed to phased array passband calibration, which permits repeated calibration of the antenna system in the field without a moving far field sensor. An implementation includes an equalization filter coupled to a phased array feed; a calibration probe disposed to couple with the antenna array to transfer radio frequency (RF) energy; a database of probe-to-far-field (FF) transforms having a probe-to-FF transform for each of a plurality of incidence angles; a calibration component operable to: receive calibration probe measurements for a plurality of frequencies; and determine a calculated phased array passband response for at least a first incidence angle, based at least on the calibration probe measurements and a probe-to-FF transform for the first incidence angle; and a filter generation component operable to generate a tuning configuration for the equalization filter, based at least on the calculated phased array passband response.

The features, functions, and advantages that have been discussed are achieved independently in various implementations or are to be combined in yet other implementations, further details of which are seen with reference to the following description and drawings.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
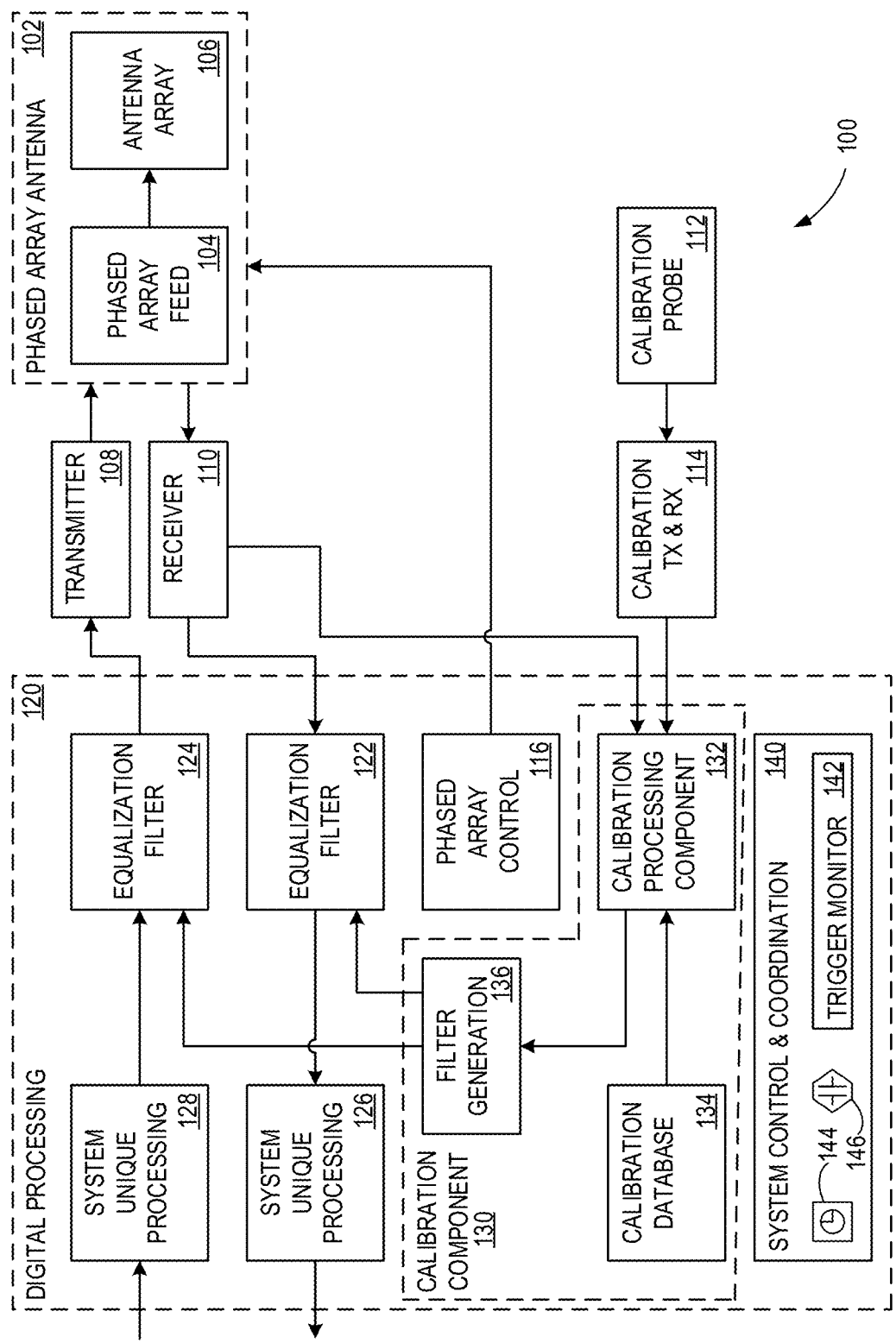
FIG. 1 illustrates a wireless system 100 employing phased array passband calibration.

The various implementations will be described in detail with reference to the accompanying drawings. Wherever possible, the same reference numbers will be used throughout the drawings to refer to the same or like parts. References made throughout this disclosure relating to specific implementations and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to "one implementation" are not intended to be interpreted as excluding the existence of additional implementations that also incorporate the recited features. Moreover, unless explicitly stated to the contrary, implementations "comprising" or "having" an element or a plurality of elements having a particular property could include additional elements not having that property.

Phased arrays are able to steer antenna beams by weighting and phase-shifting replicas of a signal to be transmitted (and also to steer a beam for reception). Unfortunately, the electrical components used for phase shifting and weighting are typically susceptible to aging effects and exhibit temperature dependence. These conditions are potentially frequency dependent and degrade performance, reducing link margin. This motivates the use of calibration processes that characterize and compensate for frequency dependent effects. A typical approach is to characterize the hardware passband response and then create an equalization filter that has a passband response that is the inverse of the hardware. This characterization and compensation process is often called passband calibration.

Typical calibration processes involve the use of a far-field probe to measure radiated field strength at various incidence angles, for various frequencies of interest (e.g., frequencies within the passband of the wireless system employing the phased array). For some arrangements, calibration is not a "once-and-done" procedure, but is instead performed on a repeated basis. However, in some deployment scenarios, calibration processes using far field probes requires downtime for the entire platform. This is impractical for some heavily-tasked systems, such as some operational aircraft and also orbital platforms.

Therefore, a solution is proposed that leverages calculated transforms, determined during an initial calibration procedure, to obviate the need for a far-field probe during subsequent calibration procedures. Some aspects and implementations disclosed herein are directed to phased array passband calibration, which permits repeated calibration of the antenna system in the field without a moving far field sensor. An implementation includes an equalization filter coupled to a phased array feed; a calibration probe disposed to couple with the antenna array to transfer radio frequency (RF) energy; a database of probe-to-far-field (FF) transforms having a probe-to-FF transform for each of a plurality of incidence angles; a calibration component operable to: receive calibration probe measurements for a plurality of frequencies; and determine a calculated phased array passband response for at least a first incidence angle, based at least on the calibration probe measurements and a probe-to-FF transform for the first incidence angle; and a filter generation component operable to generate a tuning configuration for the equalization filter, based at least on the calculated phased array passband response.

This advantageously enables repeated calibrations at times and during operational conditions in which the use of a far-field probe is impractical. The concept is indicated by notional equations, Equation 1 (during the initial calibration at time 1) and Equation 2 (during subsequent calibrations at time 2 and later):

$$\text{calculated transform} \propto \frac{\text{far field } (FF) \text{ measurement at time 1}}{\text{calibration probe measurement at time 1}} \quad \text{Equation 1}$$

$$\text{calculated } FF \text{ at time 2} \propto \quad \text{Equation 2}$$

calibration probe measurement at time 2 × calculated transform

A solution presented herein characterizes the passband response of each element in a phased array antenna (e.g., the phased array antenna 102 of FIG. 1) using a simultaneous two-location measurement technique that eliminates the need to separately characterize the calibration hardware. The first measurement location is mobile and is used to characterize the performance of the array element. The second measurement location is fixed and is used to characterize the passband performance of the array element. Placing the second measurement location at a fixed location introduces an unknown amplitude and phase error into the passband characterization. However, by making two simultaneous measurements, this unknown error is eliminated. The solution uses a performance model of a phased array supported by array element measurements via a built-in calibration probe (e.g., the calibration probe 112 of FIG. 1) to predict the passband response of the phased array antenna (e.g., the phased array antenna 102), and uses a simultaneous two-point measurement technique and a modified performance model to eliminate the need to model or estimate the calibration probe related biases.

The calibration probe 112 that is deployed with the phased array antenna 102 facilitates calibration in the field, eliminating the need to move to a special calibration location (e.g., a laboratory or test chamber environment), and also reducing the associated cost and operational impact from downtime. Using measurements from the calibration probe 112, and the calculated transforms (see Equations 1 and 8), the phased array antenna performance model 502 is generated that indicates a plurality of radiation patterns (e.g., frequency divisions of the antenna data cube 504), over a range of incidence angles, at each of a plurality of frequencies. Points that lie within a static beam, which is not being steered to those points, are spatially offset from the bore sight, or spatially offset from the peak, of the beam. Such points are spatial points within the beam, located spatial angles (or incidence angles) within the beam.

Figure 2:
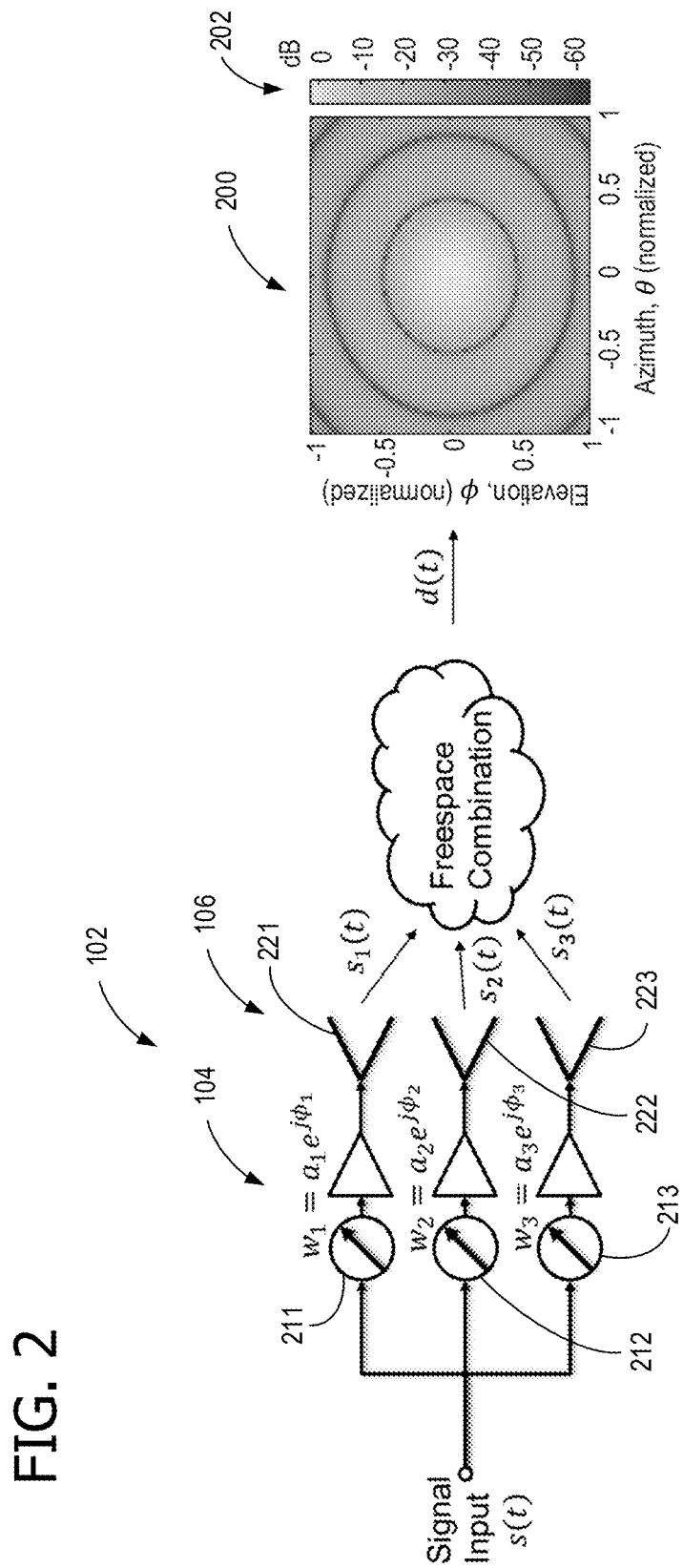
FIG. 2 illustrates additional detail for the phased array antenna 102 of FIG. 1.

FIG. 1 illustrates a wireless system 100 employing phased array passband calibration. The wireless system 100 includes a phased array antenna 102 that includes a phased array feed 104 and an antenna array 106 coupled to the phased array feed 104. The antenna array 106 and the phased array feed 104 together form at least a portion of a phased array antenna 102. A phased array control 116 controls at least the phased array feed 104 to electrically steer the antenna array 106. Additional detail is shown in FIG. 2, and described below. The phased array antenna 102 is the air interface through which the wireless system 100 communicates wirelessly with remote nodes.

An equalization filter 122 is coupled to the phased array feed 104 through a receiver 110 and is disposed to filter an output of the receiver 110. The receiver 110 converts radio frequency (RF) energy picked up by the antenna array 106 into a baseband signal for processing by a digital processing component 120 that includes various functional components as shown. In some implementations, the receiver 110 is operative to not only receive the signals that are part of the operational purpose of the wireless system 100, but also calibration signals, as described below. The equalization filter 122 forwards equalized (calibrated) signals to a system unique processing component 126 that performs processing in accordance with the functional purpose of the wireless system 100 and outputs the signals. The digital processing component 120 includes memory and processing capability as necessary to perform the functions described herein. In some implementations, at least a portion of the digital processing component 120 is implemented using at least a portion of the computing device 800 of FIG. 8.

In some implementations, another equalization filter 124 is coupled to the phased array feed 104 through a transmitter 108 and is disposed to filter an input to the transmitter 108. The transmitter 108 includes an RF power amplifier and antenna matching circuitry, and drives the phased array antenna 102 to transmit a signal at RF. The equalization filter 124 receives signals from a system unique processing component 128 and equalizes (calibrates) those signals for transmission by the phased array antenna 102.

A calibration probe 112 is disposed to couple with the antenna array 106 to transfer RF energy from the calibration probe 112 to the antenna array 106 or from the antenna array 106 to the calibration probe 112. For example, RF signals emitted by the calibration probe 112 propagate to the antenna array 106, and RF signals emitted by the antenna array 106 propagate to the calibration probe 112. The calibration probe 112 is disposed in a fixed position relative to the antenna array 106 (see FIG. 3), and is coupled to a calibration transmitter and receiver 114 that drives the calibration probe 112 and/or receives RF energy picked up by the calibration probe 112.

A calibration component 130 includes a calibration processing component 132, a calibration database 134, and a filter generation component 136. Utilizing the various parts, the calibration component 130 is operable to receive calibration probe measurements for a plurality of frequencies from the calibration probe 112, via the calibration transmitter and receiver 114. The calibration probe measurements comprise at least one measurement selected from the list consisting of: RF energy transmitted by the antenna array 106 to the calibration probe 112 and RF energy transmitted by the calibration probe 112 to the antenna array 106. The calibration component 130 is further operable to determine a calculated phased array passband response (e.g., a passband response 506 or 508, see FIG. 5) for at least a first incidence angle and also a plurality of other incidence angles, based at least on the calibration probe measurements and a probe-to-FF transform for the first incidence angle. Further details on this determination are provided below. In some implementations, the incidence angles are two-dimensional (2D) angles having azimuth and elevation components.

The calibration database 134 stores probe-to-far-field (FF) transforms having a probe-to-FF transform for each of a plurality of elements in the array 221-223, and is accessed by the calibration processing component 132 for determining calculated phased array passband responses. That is, probe-to-FF transforms are measured for each element over a plurality of incidence angles and frequencies. In some implementations, the calibration component 130 is further operable to determine a calculated radiation pattern (e.g., one of the calculated radiation patterns 510 and 512) of the phased array antenna 102 for each of a plurality of frequencies across a plurality of incidence angles including the first incidence angle, based at least on the calibration probe measurements and probe-to-FF transforms for the plurality of incidence angles. In some implementations, determining the calculated phased array passband response for the first incidence angle comprises determining a frequency response across the calculated radiation patterns at the first incidence angle.

The filter generation component 136 (which is a part of the calibration component 130) receives probe-to-FF transforms and element weights for a specific phased array setting (e.g., a specific steering angle) from the calibration processing component 132 and the calibration database 134. The filter generation component 136 is operable to generate a tuning configuration for the equalization filter, based at least on the calculated phased array passband response. That is, the filter generation component 136 generates weight settings for the equalization filter 122 and/or the equalization filter 124. The tuning configuration renders a passband of the equalization filter 122 or 124 into an inverse of the calculated phased array passband response.

A system control and coordination component 140 is operable to control the calibration process and other operations of the digital processing component 120. The system control and coordination component 140 includes a calibration trigger component 142, a timer, and a sensor 146. In some implementations, the sensor 146 is an environmental sensor, such as a temperature sensor. The calibration trigger component 142 is operable to trigger a calibration process based at least on a trigger event selected from the list consisting of a timer event (timed by the timer 144) and a sensed environmental condition (sensed by the sensor 146).

FIG. 2 illustrates additional detail for the phased array antenna 102 of FIG. 1. The phased array antenna 102 produces a radiation pattern 200, which is displayed in a 2D intensity plot with azimuth θ and elevation φ angles normalized from +/−90 degrees. An intensity legend 202 is also exhibited. The phased array feed 104 includes a plurality of phase shifters 211, 212, and 213, with accompanying amplitude weighting components. The antenna array 106 includes a plurality of radiating elements 221, 222, and 223. Although three sets are shown, it should be understood that a different number of phased array elements are used in some implementations. Additionally, some implementations include passive elements within antenna array 106.

The phased array antenna 102 intakes a signal s(t), shift and weights s(t) by the plurality of phase shifters 211, 212, and 213, as indicated by Equation 3, and transmits a plurality of signals that arrive at an observation point as a superposition, as indicated by Equation 4:

$$w_1 = a_1 e^{j\gamma_1}$$
$$w_2 = a_2 e^{j\gamma_2}$$
$$w_3 = a_3 e^{j\gamma_3}$$

Equation 3

$$E_t(\theta, \phi) = \sum_{n=1}^{N} w_n E_n(\theta, \phi) \frac{e^{-jkr_n}}{|r_n|}$$

Equation 4 where γ is the phase shift applied (in radians), $E_t$ is the total electric field at an observation point at incidence angle [θ, φ] and radial distance r, $E_n$ is the electric field radiated by the $n^{th}$ radiating element, $w_n$ is the weight applied to the $n^{th}$ radiating element, and k is the wave number (which includes the frequency f of the signal s(t)). As indicated in FIG. 2, d(t) is the far field superposition (summation) of $s_1(t)$, $s_2(t)$, and $s_3(t)$, which produces the radiation pattern 200 over the various azimuth θ and elevation φ angles. Typical convention indicates the radiation power as proportional to the square of the electric field strength.

Figure 3:
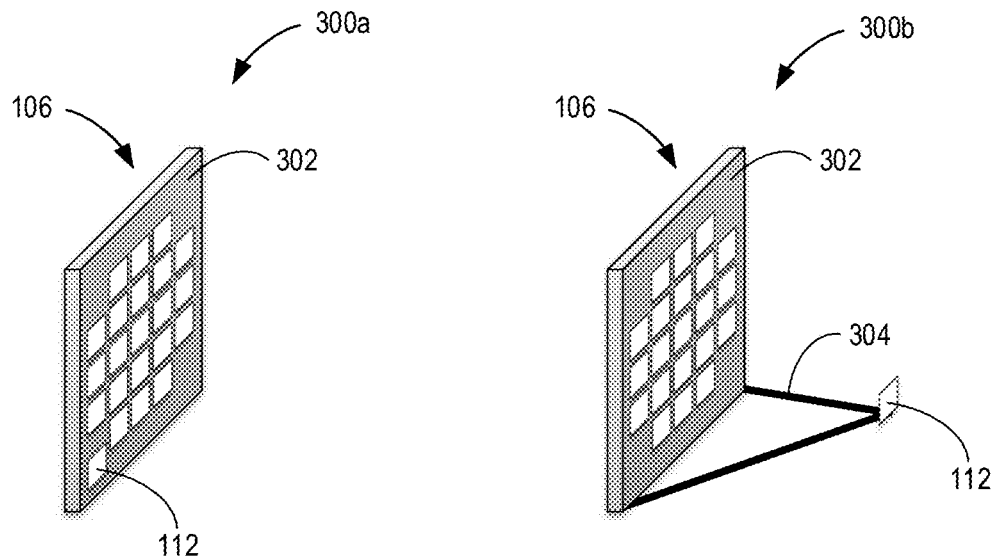
FIG. 3 illustrates options for positioning the calibration probe 112 relative to the phased array antenna 102 of FIG. 1.

FIG. 3 illustrates options for positioning the calibration probe 112 relative to the phased array antenna 102 of FIG. 1. In positioning scenario 300*a*, the calibration probe 112 is mounted on the structure 302 that holds the antenna array 106, such as within the same plane. In positioning scenario 300*b*, the calibration probe 112 is mounted on another structure 304, such as a support structure or a reflector arrangement. In both the positioning scenario 300*a* and the positioning scenario 300*b*, the calibration probe 112 is in a fixed location.

Figure 4:
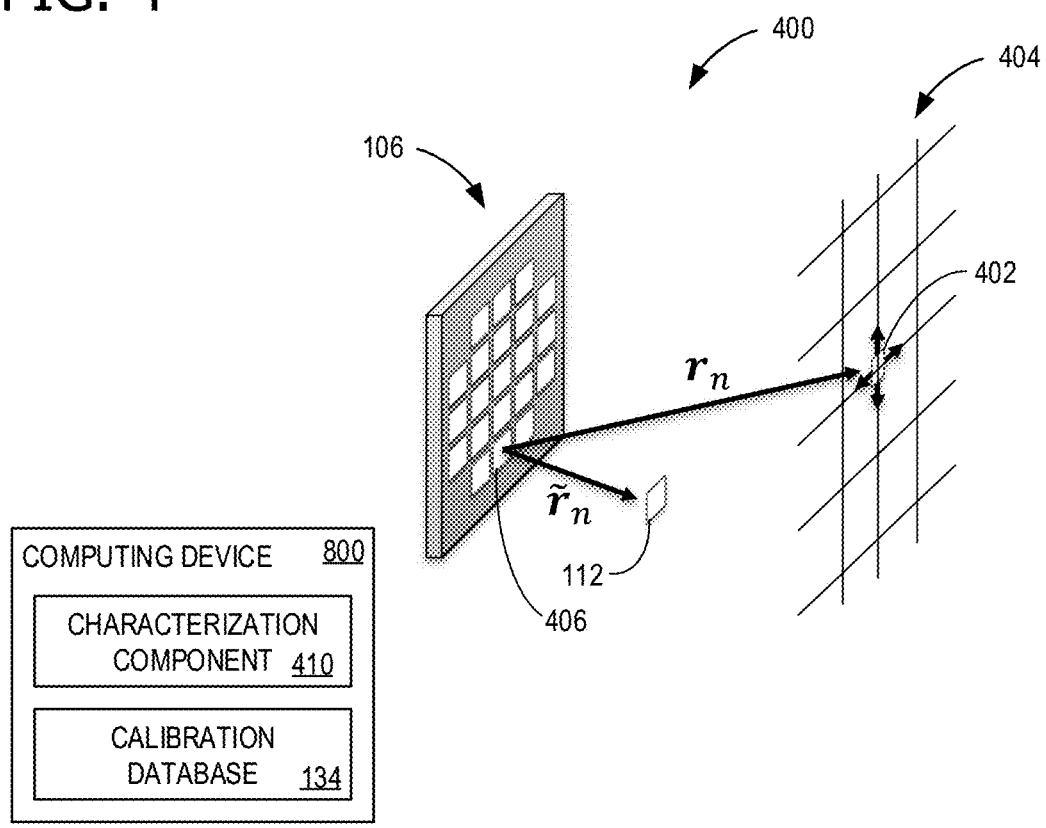
FIG. 4 illustrates characterization geometry for the phased array antenna 102 of FIG. 1.

FIG. 4 illustrates characterization geometry 400 for the antenna array 106, the calibration probe 112, and a far field scanning probe 402. The far field scanning probe 402 is operable to measure RF energy transmitted by the antenna array 106 at each of the plurality of incidence angles. The far field scanning probe 402 is movable relative to the antenna array, and moves on a measurement grid 404, whereas the calibration probe 112 is fixed. Although the measurement grid 404 is illustrated as planar, various measurement scenarios use far field measurement locations that are non-planar and/or non-regularly spaced in azimuth and elevation angles. As illustrated the far field scanning probe 402 is located at a vector location $r_n$ relative to an element 406 (the $n^{th}$ radiating element), and the calibration probe 112 is located at a vector location $\bar{r}$ relative to the element 406.

An implementation of the computing device 800 collects measurement data from the far field scanning probe 402 and the calibration probe 112. The computing device 800 is described in additional detail with respect to FIG. 8. A characterization component 410 on the computing device 800 (or another computing node communicatively coupled to the computing device 800) is operable to generate the calibration database 134 of probe-to-FF transforms, based at least on comparing calibration probe measurements (from the calibration probe 112) with scanning probe measurements (from the far field scanning probe 402). The calibration database 134 is then copied from the computing device 800 into digital processing component 120 (of FIG. 1), if necessary.

In some implementations, to leverage a phased array performance model, it is valuable to know the electric field pattern for each array element, and the effective weighting of each array element. In some implementations, the electric field pattern is measured using far-field or near-field scanners, and the effective weighting is measured using the calibration probe 112 at a fixed location. Biases introduced by the use of the calibration probe 112 in a near-field location are potential error sources. However, when measurements are taken simultaneously (from both the calibration probe 112 and the far field scanning probe 402), the need for removing the biases is precluded as indicated in Equations 5 through 12, below.

An electric field is measured by the far field scanning probe 402 in the far field of the $n^{th}$ radiating element (the element 406), and is:

$$E_{element} = w_n E_n(\theta, \phi) \frac{e^{-jkr_n}}{|r_n|} \quad \text{Equation 5}$$

Although Equation 5 is shown for a single radiating element, the analysis is cumulative of all radiating elements on the antenna array 106. It is not necessary to measure $E_{element}$ in the far field, and near-field scanning techniques are possible, in some implementations. In general, the radiation pattern produced by an array element will differ based upon whether the element is alone in free space, or is among other elements.

The electric field measured by the calibration probe 112 for the $n^{th}$ radiating element is:

$$E_{probe} = w_n E_n(\theta, \phi) \frac{e^{-jk\bar{r}_n}}{|r_n|} \quad \text{Equation 6}$$

Which can be simplified to:

$$E_{probe} = w_n \alpha_n e^{j\beta_n} \quad \text{Equation 7}$$

This still holds, even when the calibration probe 112 is not in the far field of the antenna array 106. The complex weight $w_n$ is still present in Equation 7. Since the calibration probe 112 is in a fixed location, $\bar{r}$ is unique to the element 406 and all other elements of antenna array 106.

Using the form of Equation 1, and noting that $w_n$ is present in both Equations 6 and 7 now leads to:

$$T_n = \frac{E_{element}}{E_{probe}} = \frac{E_n(\theta, \phi)\frac{e^{-jkr_n}}{|r_n|}}{\alpha_n e^{j\beta_n}} \quad \text{Equation 8}$$

Equation 8 highlights the useful result that the probe-to-FF transform $T_n$ is independent of the complex weight $w_n$. This permits creating of a phased array performance model:

$$E_t(\theta, \phi) = \sum_{n=1}^{N} \hat{w}_n T_n \quad \text{Equation 9}$$

where $\hat{w}_n$ represents an estimate of effective phase weights.

In order to use calibration probe measurements from the calibration probe 112 as estimate of probe weights, and using Equation 7, $\hat{w}_n$ is set as indicated in Equation 10:

$$\hat{w}_n = E_{probe} = w_n \alpha_n e^{j\beta_n} \quad \text{Equation 10}$$

Using Equation 10 with Equation 9 gives:

$$E_t(\theta, \phi) = \sum_{n=1}^{N} w_n \alpha_n e^{j\beta_n} T_n \quad \text{Equation 11}$$

Applying the definition of transform $T_n$ from Equation 8 gives:

$$E_t(\theta, \phi) = \sum_{n=1}^{N} w_n \alpha_n e^{j\beta_n} \frac{E_n(\theta,\phi)\frac{e^{-jkr_n}}{|r_n|}}{\alpha_n e^{j\beta_n}} \quad \text{Equation 12}$$

After cancelling the bias from the calibration probe 112, Equation 12 becomes:

$$E_t(\theta, \phi) = \sum_{n=1}^{N} w_n E_n(\theta, \phi) \frac{e^{-jkr_n}}{|r_n|} \quad \text{Equation 13}$$

which is the same as Equation 4. Thus, it is possible to use calibration probe measurements from the calibration probe 112 to generate an antenna data cube 504 (as shown in FIG. 5) of calculated radiation patterns for the phased array antenna 102, without relying on the further use of the far field scanning probe 402.

Figure 5:
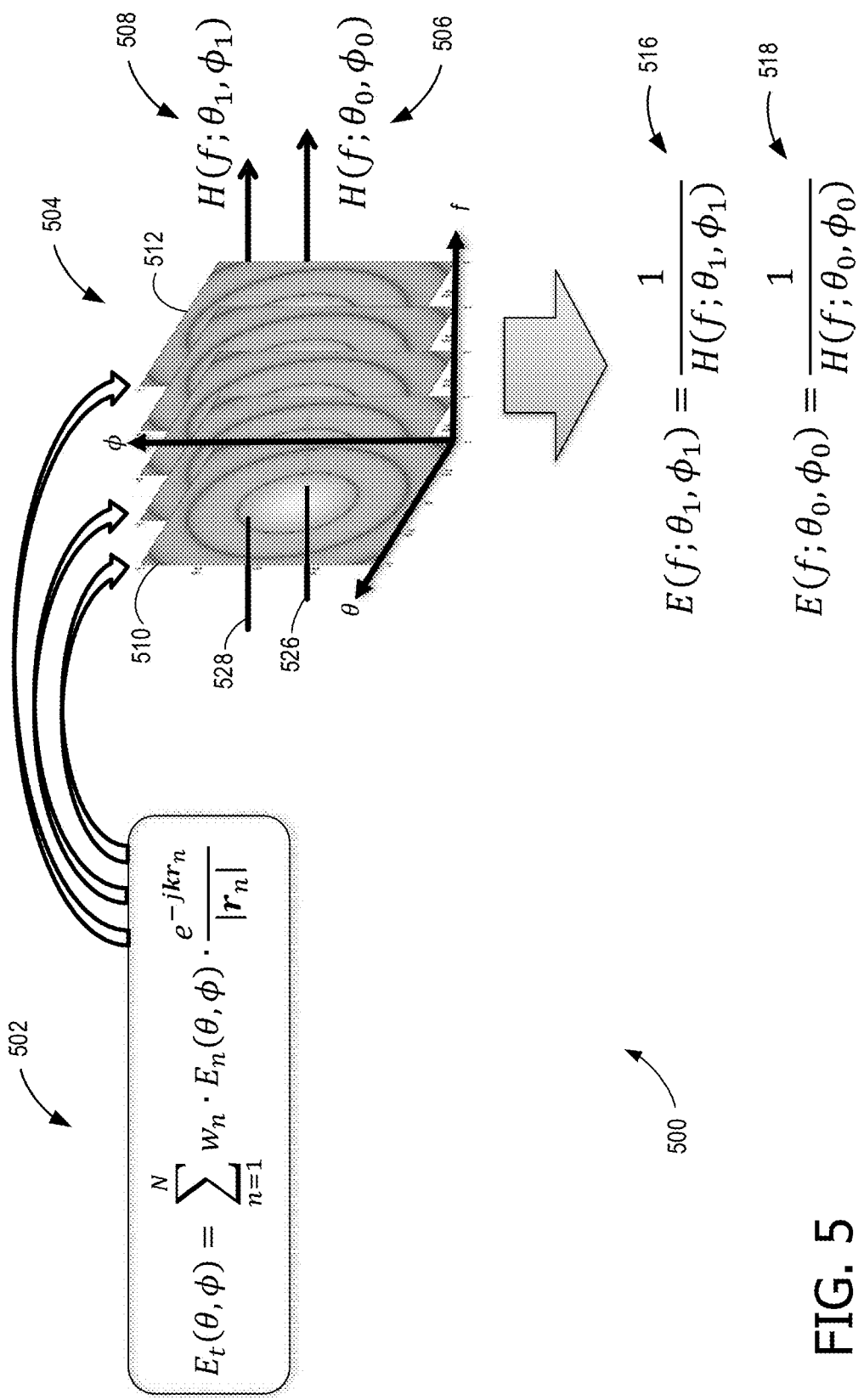
FIG. 5 is a graphical depiction of generating equalization filter responses 516 and 518 from a phased array antenna performance model 502 corresponding to the phased array antenna 102 of FIG. 1.

FIG. 5 is a graphical depiction of generating equalization filter responses 516 and 518 from a phased array antenna performance model 502 corresponding to the phased array antenna 102 of FIG. 1. The phased array antenna performance model 502 is derived from Equation 13 (which is the same as Equation 4), and is used to generate the antenna data cube 504 of calculated radiation patterns for the phased array antenna 102. Generating the antenna data cube 504 involves determining a calculated radiation pattern (e.g. calculated radiation pattern 510 or 512) of the phased array antenna 102 for each of a plurality of frequencies across the passband of the wireless system 100. The calculated radiation patterns extend across at least a plurality of incidence angles, and possibly beyond the operational steering limits of the phased array antenna 102.

A calculated phased array passband response is determined for at least a first incidence angle, for example, a incidence angle with azimuth $\theta_0$ and elevation $\phi_0$ as shown. A vector 526 indicates a sampling across the set of frequencies f of the calculated radiation patterns at the incidence angle with azimuth $\theta_0$ and elevation $\phi_0$. These data points are used to ascertain the frequency transfer function, which is a passband response 506 for the phased array antenna 102.

The passband response 506 is denoted as H(f, $\theta_0$, $\phi_0$). For comparison a second passband response 508, denoted as H(f, $\theta_1$, $\phi_1$), is shown for a second incidence angle with azimuth $\theta_1$ and elevation $\phi_1$.

Converting from a passband response (frequency transfer function) to a desired filter response is generally straight-forward. For a signal s(t) having a frequency transfer function Ho, the desired filter response is the inverse of the transfer function H(f). For the general case of a incidence angle with azimuth $\theta$ and elevation $\phi$, this results in Equation 14:

$$E(f;\theta,\varnothing) = 1/H(f;\theta,\varnothing) \qquad \text{Equation 14}$$

which can is used to generate the equalization filter responses 516 and 518, as shown.

Figure 6:
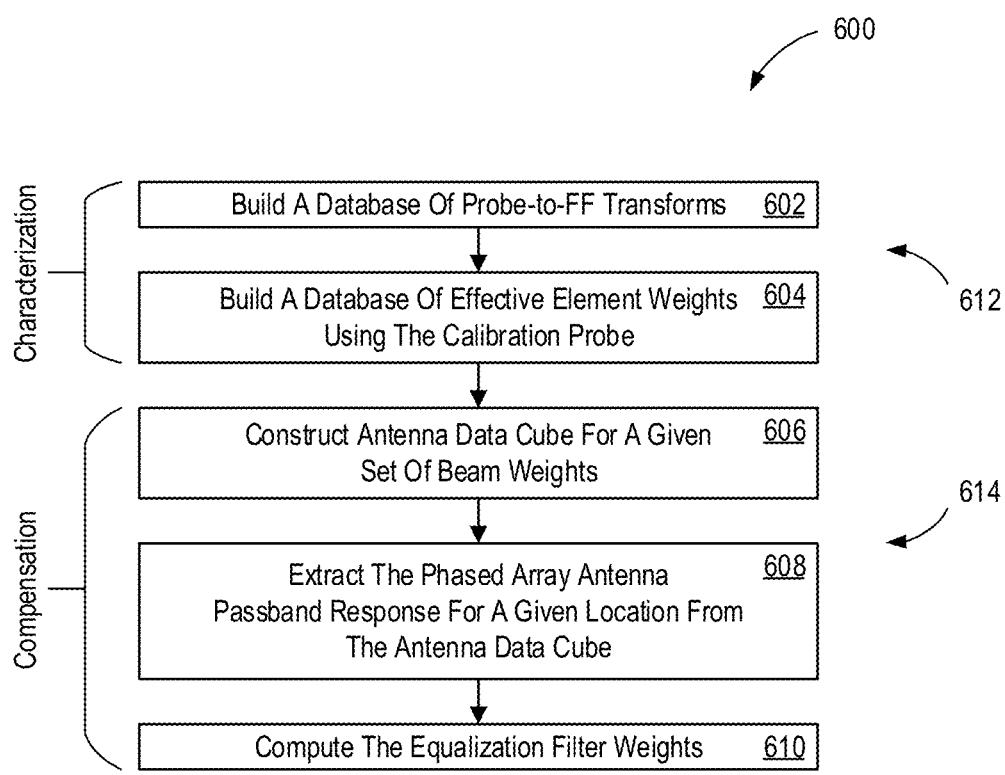
FIG. 6 is a flow chart illustrating a process 600 for phased array passband calibration for the phased array antenna 102 of FIG. 1.

FIG. 6 is a flow chart illustrating a process 600 for phased array passband calibration for the phased array antenna 102 of FIG. 1. The process 600 has a calibration phase 612, which includes operations 602 and 604, and a compensation phase 614, which includes operations 606, 608, and 610. The process 600 roughly corresponds with operations 702 through 724 of the process 700 of FIG. 7. In operation 602 the calibration database 134 is built of probe-to-FF transforms. A possible algorithm for this operation is given as:
1. Select spacing for the measurement grid 404;
2. For each location of the far field scanning probe 402 m=1, . . . M
   a. For each element n=1, . . . N
      i. For each frequency f=1 . . . F $$E_{element}^n = w_n E_n(\theta_m, \phi_m) \frac{e^{-jkr_{n,m}}}{|r_{n,m}|} \qquad \text{Equation 15}$$

$$E_{probe}^n = w_n \alpha_n e^{j\beta_n} \qquad \text{Equation 16}$$

$$T_n = \frac{E_{element}^n}{\langle E_{probe}^n \rangle} \qquad \text{Equation 17}$$

which is stored in the calibration database 134, indexed by element number n, frequency f, and incidence angle azimuth $\theta$ and elevation $\phi$.

In operation 604, a database of effective element weights is built, using the calibration probe 112, according to Equation 18.

$$E_{probe}^{n,l,p,f} = w_{n,l,p,f} \alpha_{n,f} e^{j\beta_{n,f}} \qquad \text{Equation 18}$$

where l and p are indices of various amplitude and phase settings, respectively. This data is stored in the calibration database 134, the calibration processing component 132, or another storage location available to the digital processing component 120. During this operation 604, there are at least two optional calibration signal paths. One calibration signal path is from the transmitter 108 through the phased array antenna 102, radiating to the calibration probe 112, through the calibration transmitter and receiver 114, and then to the calibration processing component 132. Another calibration signal path is from the calibration transmitter and receiver 114, through the calibration probe 112, radiating to the phased array antenna 102, through the receiver 110, and then to the calibration processing component 132. In some implementations, measurements are also taken and indexed according to environmental conditions, such as temperature (and as can be sensed by the sensor 146).

In operation 606, the antenna data cube 504 is constructed for a given set of beam weights, using Equation 9 shown above. The necessary data is pulled from the calibration database 134 and/or the calibration processing component 132. Each calculated radiation pattern (across a range of incidence angles) forms one plane of the antenna data cube 504. In operation 608, the passband response (e.g., the passband response 506 or 508) for the phased array antenna 102 is extracted for a given location (incidence angle) with azimuth $\theta$ and elevation $\phi$. This produces an H(f; $\theta$, $\phi$)) for the selected incidence angle. Then, in operation 610, the equalization filter weights are computed, according to Equation 14 shown above.

Figure 7:
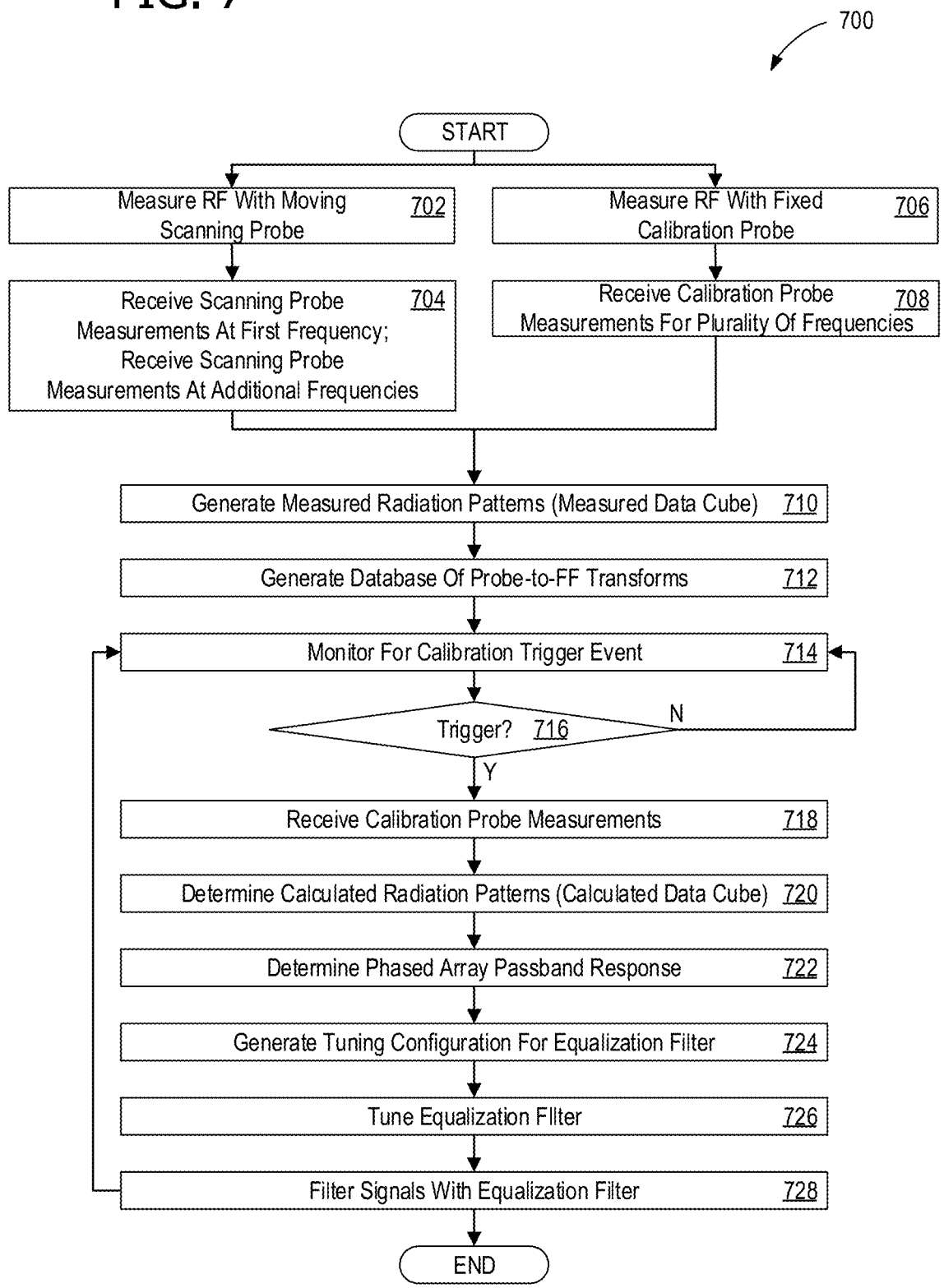
FIG. 7 is a flow chart illustrating a process 700 for phased array passband calibration for the phased array antenna 102 of FIG. 1.

FIG. 7 is a flow chart illustrating a process 700 for phased array passband calibration for the phased array antenna 102 of FIG. 1. In some implementations some or all of the operations of process 700 are performed by the computing device 800 of FIG. 8, for example by executing instructions (stored in the memory 802) with one or more processors 804. In one implementation, operation 702 includes measuring, with the far field scanning probe 402, RF energy transmitted by the phased array antenna 102 at each of the plurality of incidence angles, wherein the far field scanning probe 402 is movable relative to the antenna array 106. Operation 704 includes receiving measurements, from the far field scanning probe 402 moving in azimuth and elevation relative to the antenna array 106, of RF energy at a first frequency transmitted by the phased array antenna 102, at each of a plurality of incidence angles to generate the radiation pattern 200 as a measured 2D radiation pattern. In some implementations, operation 704 also includes receiving measurements, from the far field scanning probe 402, of RF energy at additional frequencies.

In parallel with operations 702 and 704, operation 706 includes measuring the RF energy transmitted by the phased array antenna 102 with the fixed-position calibration probe and operation 708 includes receiving measurements, from a calibration probe disposed in a fixed position relative to the phased array antenna, of RF energy for the plurality of frequencies, thereby collecting initial calibration probe measurements for the plurality of frequencies. For each of the plurality of incidence angles, measurements of RF energy by the far field scanning probe 402 and fixed position calibration probe 112 are taken simultaneously (from both the calibration probe 112 and the far field scanning probe 402). An initial antenna data cube (using measured radiation patterns) is generated in operation 710. Thus, operation 710 includes generating, for each frequency of a plurality of frequencies, a measured 2D radiation pattern, the plurality of frequencies including the first frequency and the additional frequencies.

Operation 712 includes generating the calibration database 134 of probe-to-FF transforms, based at least on performing a calculation with calibration probe measurements and scanning probe measurements. In some implementations, this includes generating, based at least on the measured 2D radiation patterns and the calibration probe measurements, a database of probe-to-FF transforms having a probe-to-FF transform for each of the plurality of incidence angles. Operation 714 includes monitoring for a calibration trigger event selected from the list consisting of a timer event and a sensed environmental condition. If, in decision operation 716, the trigger event is not detected, the process 700 returns to operation 714.

When a trigger event has been detected, operation 718 includes receiving, from the calibration probe 112 coupled with the antenna array 106 to transfer RF energy, calibration probe measurements for a plurality of frequencies. In some implementations, this includes based at least upon a calibration trigger event, receiving, from the calibration probe, secondary calibration probe measurements for the plurality of frequencies. In some implementations, the calibration probe measurements comprise at least one measurement selected from the list consisting of RF energy transmitted by the antenna array 106 to the calibration probe 112 and RF energy transmitted by the calibration probe 112 to the antenna array 106. Operation 720 includes determining a calculated radiation pattern (e.g. calculated radiation pattern 510 or 512) of the phased array antenna 102 for each of the plurality of frequencies across a plurality of incidence angles including the first incidence angle, based at least on the calibration probe measurements and probe-to-FF transforms for the plurality of incidence angles. In some implementations, this includes determining a calculated 2D radiation pattern of the phased array antenna for each of the plurality of frequencies across the plurality of incidence angles, based at least on the secondary calibration probe measurements and probe-to-FF transforms for the plurality of incidence angles. In some implementations, this results in the generation of the calculated antenna data cube 504, which is in contrast with the initial antenna data cube generated in operation 710, which used measured radiation patterns.

Operation 722 includes determining a calculated phased array passband response for at least a first incidence angle, based at least on the calibration probe measurements and a probe-to-FF transform for at least a first incidence angle. In some implementations the first incidence angle is a 2D angle having azimuth and elevation components. In some implementations, determining the calculated phased array passband response for the first incidence angle comprises determining a frequency response across the calculated radiation patterns at the first incidence angle. In some implementations, operation 722 includes determining a calculated phased array passband response for a first incidence angle within the plurality of incidence angles, based at least on the secondary calibration probe measurements and the probe-to-FF transform for the first incidence angle.

Operation 724 includes generating a tuning configuration for the equalization filter 122 or 124, based at least on the calculated phased array passband response. In some implementations, the tuning configuration renders a passband of the equalization filter 122 or 124 into an inverse of the calculated phased array passband response. Operation 726 includes tuning the equalization filter 122 or 124, based at least on the tuning configuration. Operation 728 includes filtering, with the equalization filter 122 or 124, at least one signal s(t) selected from the list consisting of an output of a receiver and an input to a transmitter.

Figure 8:
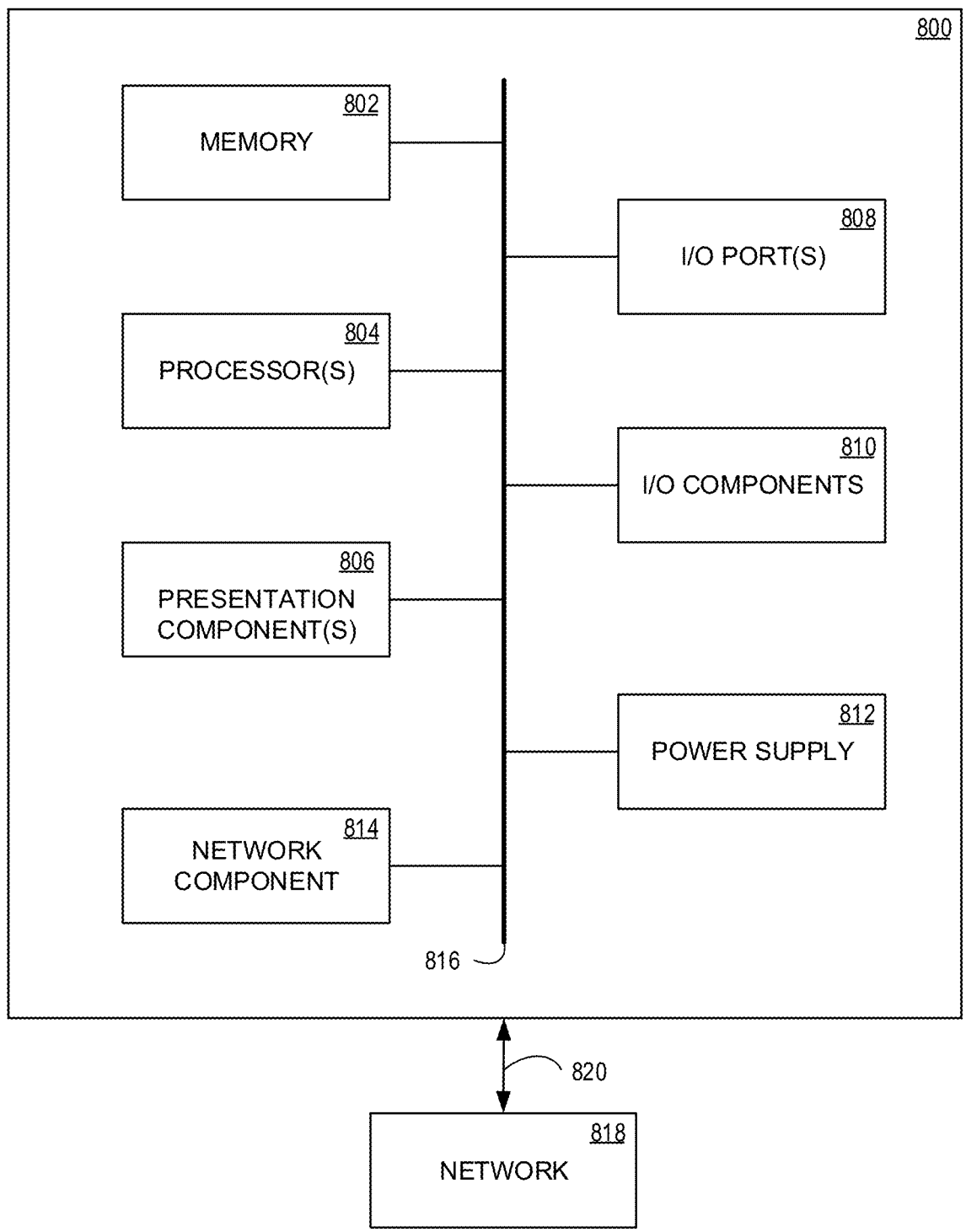
FIG. 8 is a block diagram of a computing device 800 suitable for implementing various aspects of the disclosure.

With reference now to FIG. 8, a block diagram of the computing device 800 suitable for implementing various aspects of the disclosure is provided. In some implementations, the computing device 800 includes the one or more processors 804, one or more presentation components 806 and the memory 802. The disclosed implementations associated with the computing device 800 are practiced by a variety of computing devices, including personal computers, laptops, smart phones, mobile tablets, hand-held devices, consumer electronics, specialty computing devices, etc. Distinction is not made between such categories as "workstation," "server," "laptop," "hand-held device," etc., as all are contemplated within the scope of FIG. 8 and the references herein to a "computing device." The disclosed implementations are also practiced in distributed computing environments, where tasks are performed by remote-processing devices that are linked through a communications network. Further, while the computing device 800 is depicted as a seemingly single device, in one implementation, multiple computing devices work together and share the depicted device resources. For instance, in one implementation, the memory 802 is distributed across multiple devices, the one or more processors 804 provided are housed on different devices, and so on.

In one implementation, the memory 802 includes any of the computer-readable media discussed herein. In one implementation, the memory 802 is used to store and access instructions configured to carry out the various operations disclosed herein. In some implementations, the memory 802 includes computer storage media in the form of volatile and/or nonvolatile memory, removable or non-removable memory, data disks in virtual environments, or a combination thereof. In one implementation, the one or more processors 804 includes any quantity of processing units that read data from various entities, such as the memory 802 or input/output (I/O) components 810. Specifically, the one or more processors 804 are programmed to execute computer-executable instructions for implementing aspects of the disclosure. In one implementation, the instructions are performed by the processor, by multiple processors within the computing device 800, or by a processor external to the computing device 800. In some implementations, the one or more processors 804 are programmed to execute instructions such as those illustrated in the flow charts discussed below and depicted in the accompanying drawings.

The one or more presentation components 806 present data indications to an operator or to another device. In one implementation, the one or more presentation components 806 include a display device, speaker, printing component, vibrating component, etc. One skilled in the art will understand and appreciate that computer data is presented in a number of ways, such as visually in a graphical user interface (GUI), audibly through speakers, wirelessly between the computing device 800, across a wired connection, or in other ways. In one implementation, the one or more presentation components 806 are not used when processes and operations are sufficiently automated that a need for human interaction is lessened or not needed. I/O ports 808 allow the computing device 800 to be logically coupled to other devices including the I/O components 810, some of which is built in. Implementations of the I/O components 810 include, for example but without limitation, a microphone, keyboard, mouse, joystick, game pad, satellite dish, scanner, printer, wireless device, etc.

The computing device 800 includes a bus 816 that directly or indirectly couples the following devices: the memory 802, the one or more processors 804, the one or more presentation components 806, the I/O ports 808, the I/O components 810, a power supply 812, and a network component 814. The computing device 800 should not be interpreted as having any dependency or requirement related to any single component or combination of components illustrated therein. The bus 816 represents one or more busses (such as an address bus, data bus, or a combination thereof). Although the various blocks of FIG. 8 are shown with lines for the sake of clarity, some implementations blur functionality over various different components described herein.

In some implementations, the computing device 800 is communicatively coupled to a network 818 using the network component 814. In some implementations, the network component 814 includes a network interface card and/or computer-executable instructions (e.g., a driver) for operating the network interface card. In one implementation, communication between the computing device 800 and other devices occur using any protocol or mechanism over a wired or wireless connection 820. In some implementations, the network component 814 is operable to communicate data over public, private, or hybrid (public and private) using a transfer protocol, between devices wirelessly using short range communication technologies (e.g., near-field communication (NFC), Bluetooth® branded communications, or the like), or a combination thereof.

Although described in connection with the computing device 800, implementations of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

Implementations of the disclosure are described in the general context of computer-executable instructions, such as program modules, executed by one or more computers or other devices in software, firmware, hardware, or a combination thereof. In one implementation, the computer-executable instructions are organized into one or more computer-executable components or modules. Generally, program modules include, but are not limited to, routines, programs, objects, components, and data structures that perform particular tasks or implement particular abstract data types. In one implementation, aspects of the disclosure are implemented with any number and organization of such components or modules. For example, aspects of the disclosure are not limited to the specific computer-executable instructions or the specific components or modules illustrated in the figures and described herein. Other implementations of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one implementation, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

Figure 9:
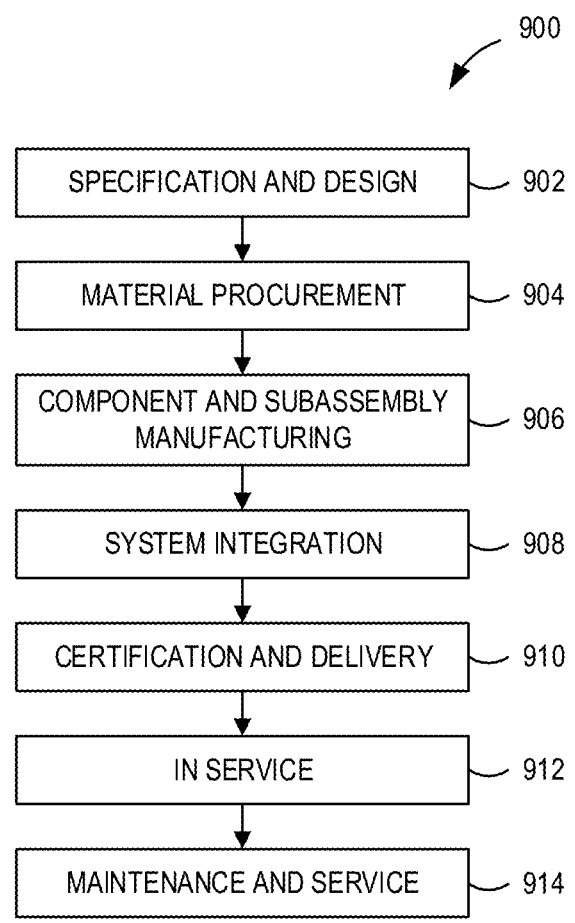
FIG. 9 is a block diagram of an apparatus of manufacturing and service method 900 that advantageously employs phased array passband calibration for the phased array antenna 102 of FIG. 1.
Figure 10:
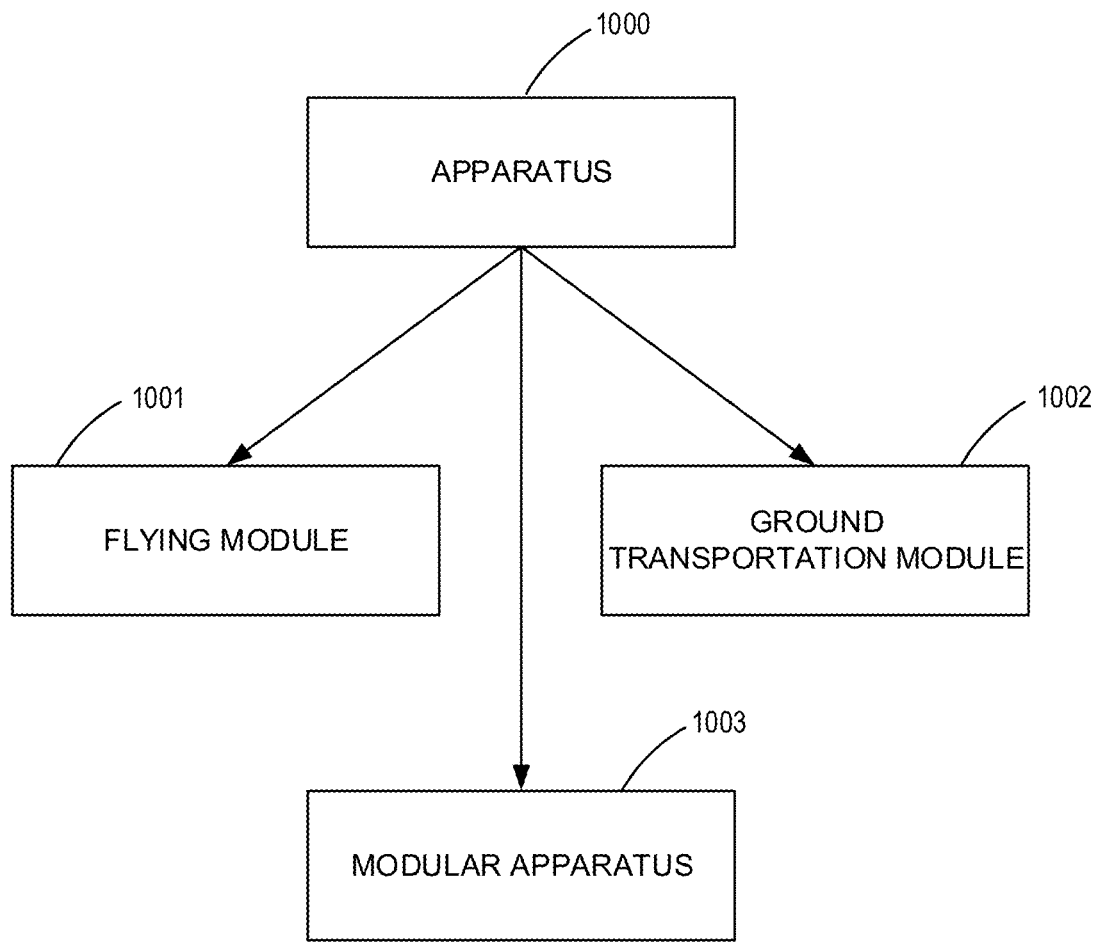
FIG. 10 is a block diagram of an apparatus 1100 that advantageously employs phased array passband calibration for the phased array antenna 102 of FIG. 1.
Figure 11:
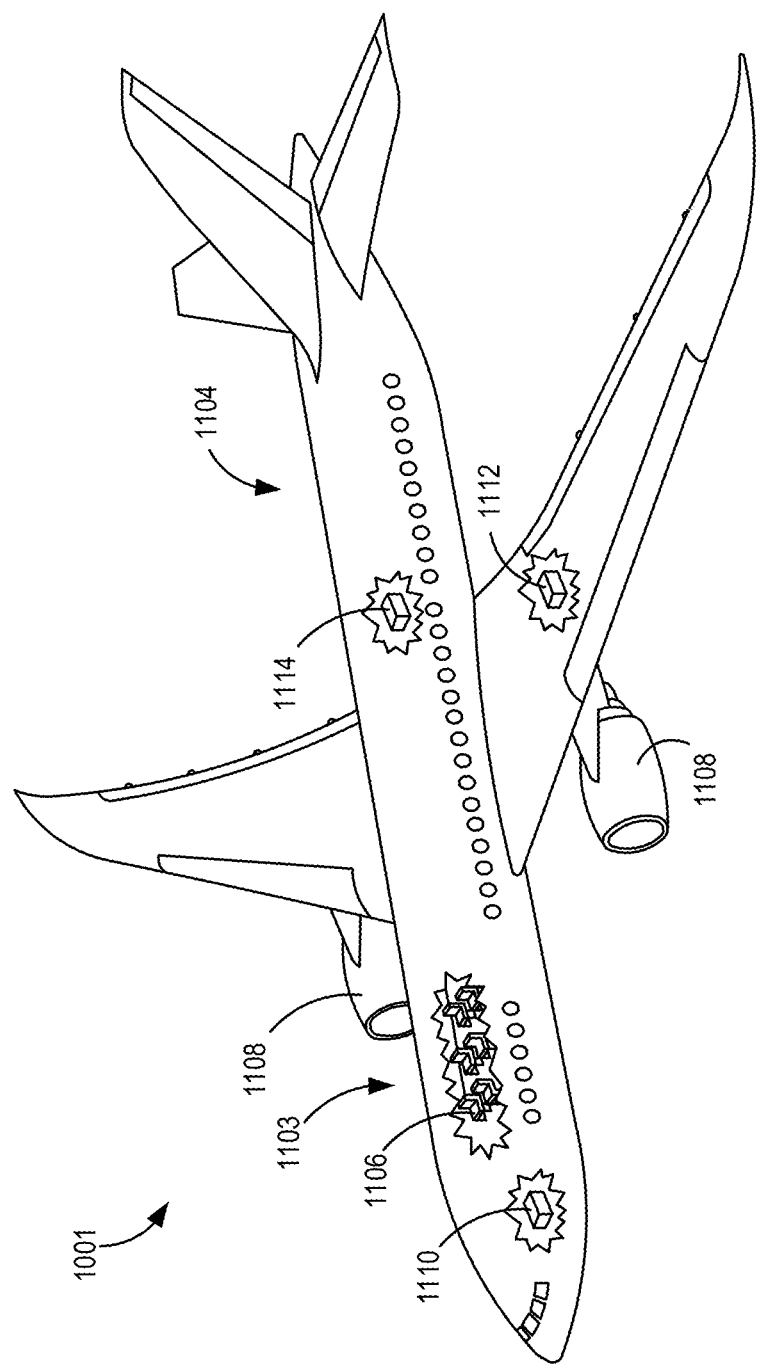
FIG. 11 is a schematic perspective view of a particular flying apparatus 1001 of FIG. 10.

Some implementations of the phased array antenna 102 (of FIG. 1) are used in manufacturing and service applications as shown and described in relation to FIGS. 9-11. Thus, implementations of the disclosure are described in the context of an apparatus of manufacturing and service method 900 shown in FIG. 9 and apparatus 1000 shown in FIG. 10. In FIG. 9, a diagram illustrating an apparatus manufacturing and service method is depicted in accordance with an implementation. In one implementation, during pre-production, the apparatus manufacturing and service method 900 includes specification and design 902 of the apparatus 1000 in FIG. 10 and material procurement 904. During production, component and subassembly manufacturing 906 and system integration 908 of the apparatus 1000 in FIG. 10 takes place. Thereafter, the apparatus 1000 in FIG. 10 goes through certification and delivery 910 in order to be placed in service 912. While in service by a customer, the apparatus 1000 in FIG. 10 is scheduled for routine maintenance and service 914, which, in one implementation, includes modification, reconfiguration, refurbishment, and other maintenance or service described herein.

In one implementation, each of the processes of the apparatus manufacturing and service method 900 are performed or carried out by a system integrator, a third party, and/or an operator. In these implementations, the operator is a customer. For the purposes of this description, a system integrator includes any number of apparatus manufacturers and major-system subcontractors; a third party includes any number of venders, subcontractors, and suppliers; and in one implementation, an operator is an owner of an apparatus or fleet of the apparatus, an administrator responsible for the apparatus or fleet of the apparatus, a user operating the apparatus, a leasing company, a military entity, a service organization, or the like.

With reference now to FIG. 10, the apparatus 1000 is provided. As shown in FIG. 10, an example of the apparatus 1000 is a flying apparatus 1001, such as an aerospace vehicle, aircraft, air cargo, flying car, and the like. In some implementations, the flying apparatus 1001 is an orbital or space-based platform. As also shown in FIG. 10, a further example of the apparatus 1000 is a ground transportation apparatus 1002, such as an automobile, a truck, heavy equipment, construction equipment, a boat, a ship, a submarine and the like. A further example of the apparatus 1000 shown in FIG. 10 is a modular apparatus 1003 that comprises at least one or more of the following modules: an air module, a payload module and a ground module. The air module provides air lift or flying capability. The payload module provides capability of transporting objects such as cargo or live objects (people, animals, etc.). The ground module provides the capability of ground mobility. The disclosed solution herein is applied to each of the modules separately or in groups such as air and payload modules, or payload and ground, etc. or all modules.

With reference now to FIG. 11, a more specific diagram of the flying apparatus 1001 is depicted in which an implementation of the disclosure is advantageously employed. In this example, the flying apparatus 1001 is an aircraft produced by the apparatus manufacturing and service method 900 in FIG. 9 and includes an airframe 1103 with a plurality of systems 1104 and an interior 1106. Implementations of the plurality of systems 1104 include one or more of a propulsion system 1108, an electrical system 1110, a hydraulic system 1112, and an environmental system 1114. However, other systems are also candidates for inclusion. Although an aerospace example is shown, different advantageous implementations are applied to other industries, such as the automotive industry, etc.

The implementations disclosed herein are described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed implementations are practiced in a variety of system configurations, including personal computers, laptops, smart phones, mobile tablets, hand-held devices, consumer electronics, specialty computing devices, etc. The disclosed implementations are also practiced in distributed computing environments, where tasks are performed by remote-processing devices that are linked through a communications network.

The following paragraphs describe further aspects of the disclosure:

A1. A wireless system employing phased array calibration, the system comprising:
   a phased array feed;
   an antenna array coupled to the phased array feed, wherein the antenna array and the phased array feed together form at least a portion of a phased array antenna;
   an equalization filter coupled to the phased array feed;
   a calibration probe disposed to couple with the antenna array to transfer radio frequency (RF) energy;
   a database of probe-to-far-field (FF) transforms having a probe-to-FF transform for each of a plurality of incidence angles;
   a calibration component operable to:
     receive calibration probe measurements for a plurality of frequencies; and
     determine a calculated phased array passband response for a first incidence angle, based at least on the calibration probe measurements and a probe-to-FF transform for the first incidence angle; and
   a filter generation component operable to generate a tuning configuration for the equalization filter, based at least on the calculated phased array passband response.

A2. The system of A1 wherein the phased array feed comprises a plurality of phase shifters.

A3. The system of A1 wherein the equalization filter is coupled to the phased array feed through a receiver and is disposed to filter an output of the receiver.

A4. The system of A1 wherein the equalization filter is coupled to the phased array feed through a transmitter and is disposed to filter an input to the transmitter.

A5. The system of A1 wherein the calibration probe is disposed in a fixed position relative to the antenna array.

A6. The system of A1 wherein the calibration probe measurements comprise at least one measurement selected from the list consisting of:
   RF energy transmitted by the antenna array to the calibration probe and RF energy transmitted by the calibration probe to the antenna array.

A7. The system of A1 wherein the first incidence angle is a two-dimensional (2D) angle having azimuth and elevation components.

A8. The system of A1 wherein the calibration component is further operable to:
   determine a calculated radiation pattern of the phased array antenna for each of the plurality of frequencies across a plurality of incidence angles including the first incidence angle, based at least on the calibration probe measurements and probe-to-FF transforms for the plurality of incidence angles, and
   wherein determining the calculated phased array passband response for the first incidence angle comprises determining a frequency response across the calculated radiation patterns at the first incidence angle.

A9. The system of A1 further comprising:
   a calibration trigger component operable to trigger a calibration process based at least on a trigger event selected from the list consisting of:
   a timer event and a sensed environmental condition.

A10. The system of A1 further comprising:
   a scanning probe operable to measure RF energy transmitted by the phased array antenna at each of the plurality of incidence angles, wherein the scanning probe is movable relative to the antenna array; and
   a characterization component operable to generate the database of probe-to-FF transforms, based at least on comparing calibration probe measurements and scanning probe measurements, where the calibration probe measurements and scanning probe measurements are simultaneously measured for each of the plurality of incidence angles.

A11. The system of A1 wherein the tuning configuration renders a passband of the equalization filter into an inverse of the calculated phased array passband response.

A12. A method of phased array calibration, the method comprising:
   receiving, from a calibration probe coupled with an antenna array to transfer radio frequency (RF) energy, calibration probe measurements for a plurality of frequencies;
   determining a calculated phased array passband response for a first incidence angle, based at least on the calibration probe measurements and a probe-to-far-field (FF) transform for the first incidence angle;
   generating a tuning configuration for an equalization filter, based at least on the calculated phased array passband response; and
   tuning the equalization filter, based at least on the tuning configuration.

A13. The method of A12 further comprising filtering, with the equalization filter, at least one signal selected from the list consisting of:
   an output of a receiver and an input to a transmitter.

A14. The method of A12 wherein the calibration probe measurements comprise at least one measurement selected from the list consisting of:

RF energy transmitted by the antenna array to the calibration probe and RF energy transmitted by the calibration probe to the antenna array.

A15. The method of A12 wherein the first incidence angle is a two-dimensional (2D) angle having azimuth and elevation components.

A16. The method of A12 further comprising:
determining a calculated radiation pattern of a phased array antenna for each of the plurality of frequencies across a plurality of incidence angles including the first incidence angle, based at least on the calibration probe measurements and probe-to-FF transforms for the plurality of incidence angles; and
wherein determining the calculated phased array passband response for the first incidence angle comprises determining a frequency response across the calculated radiation patterns at the first incidence angle.

A17. The method of A12 further comprising:
monitoring for a calibration trigger event selected from the list consisting of:
a timer event and a sensed environmental condition.

A18. The method of A12 further comprising:
measuring, with a scanning probe, RF energy transmitted by the antenna array at each of the plurality of incidence angles, wherein the scanning probe is movable relative to the antenna array; and
generating the database of probe-to-FF transforms, based at least on performing a calculation with calibration probe measurements and scanning probe measurements.

A19. The method of A12 wherein the tuning configuration renders a passband of the equalization filter into an inverse of the calculated phased array passband response.

A20. A computer program product, comprising a computer usable medium having a computer readable program code embodied therein, the computer readable program code adapted to be executed to implement a method of phased array calibration, the method comprising:
receiving measurements, from a scanning probe moving in azimuth and elevation relative to an antenna array, of radio frequency (RF) energy at a first frequency transmitted by the phased array antenna, at each of a plurality of incidence angles to generate a measured two-dimensional (2D) radiation pattern;
receiving measurements, from the scanning probe, of RF energy at additional frequencies;
generating, for each frequency of a plurality of frequencies, a measured 2D radiation pattern, the plurality of frequencies including the first frequency and the additional frequencies;
receiving measurements, from a calibration probe disposed in a fixed position relative to the phased array antenna, of RF energy for the plurality of frequencies, thereby collecting initial calibration probe measurements for the plurality of frequencies;
generating, based at least on the measured 2D radiation patterns and the calibration probe measurements, a database of probe-to-far-field (FF) transforms having a probe-to-FF transform for each of the plurality of incidence angles;
based at least upon a calibration trigger event, receiving, from the calibration probe, secondary calibration probe measurements for the plurality of frequencies;
determining a calculated 2D radiation pattern of the phased array antenna for each of the plurality of frequencies across the plurality of incidence angles, based at least on the secondary calibration probe measurements and probe-to-FF transforms for the plurality of incidence angles;
determining a calculated phased array passband response for a first incidence angle within the plurality of incidence angles, based at least on the secondary calibration probe measurements and the probe-to-FF transform for the first incidence angle; and
generating a tuning configuration for an equalization filter, based at least on the calculated phased array passband response, wherein the tuning configuration is configured to render a passband of the equalization filter into an inverse of the calculated phased array passband response.

When introducing elements of aspects of the disclosure or the implementations thereof, the articles "a," "an," "the," and "said" are intended to mean that there are one or more of the elements. The terms "comprising," "including," and "having" are intended to be inclusive and mean that there could be additional elements other than the listed elements. The term "implementation" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A wireless system employing phased array passband calibration, the system comprising:
a phased array feed;
an antenna array coupled to the phased array feed, wherein the antenna array and the phased array feed together form at least a portion of a phased array antenna;
an equalization filter coupled to the phased array feed;
a calibration probe disposed to couple with the antenna array to transfer radio frequency (RF) energy;
a database of probe-to-far-field (FF) transforms having a probe-to-FF transform for each of a plurality of incidence angles;
a calibration component operable to:
receive calibration probe measurements for a plurality of frequencies; and
determine a calculated phased array passband response for a first incidence angle, based at least on the calibration probe measurements and a probe-to-FF transform for the first incidence angle; and
a filter generation component operable to generate a tuning configuration for the equalization filter, based at least on the calculated phased array passband response.

2. The system of claim 1, wherein the phased array feed comprises a plurality of phase shifters.

3. The system of claim 1, wherein the equalization filter is coupled to the phased array feed through a receiver and is disposed to filter an output of the receiver.

4. The system of claim 1, wherein the equalization filter is coupled to the phased array feed through a transmitter and is disposed to filter an input to the transmitter.

5. The system of claim 1, wherein the calibration probe is disposed in a fixed position relative to the antenna array.

6. The system of claim 1, wherein the calibration probe measurements comprise at least one measurement selected from the list consisting of:
RF energy transmitted by the antenna array to the calibration probe and RF energy transmitted by the calibration probe to the antenna array.

7. The system of claim 1, wherein the first incidence angle is a two-dimensional (2D) angle having azimuth and elevation components.

8. The system of claim 1, wherein the calibration component is further operable to:
determine a calculated radiation pattern of the phased array antenna for each of the plurality of frequencies across a plurality of incidence angles including the first incidence angle, based at least on the calibration probe measurements and probe-to-FF transforms for the plurality of incidence angles, and
wherein determining the calculated phased array passband response for the first incidence angle comprises determining a frequency response across the calculated radiation patterns at the first incidence angle.

9. The system of claim 1, further comprising:
a calibration trigger component operable to trigger a calibration process based at least on a trigger event selected from the list consisting of:
a timer event and a sensed environmental condition.

10. The system of claim 1, further comprising:
a scanning probe operable to measure RF energy transmitted by the phased array antenna at each of the plurality of incidence angles, wherein the scanning probe is movable relative to the antenna array; and
a characterization component operable to generate the database of probe-to-FF transforms, based at least on performing a calculation with calibration probe measurements and scanning probe measurements, where the calibration probe measurements and scanning probe measurements are simultaneously measured for each of the plurality of incidence angles.

11. The system of claim 1, wherein the tuning configuration renders a passband of the equalization filter into an inverse of the calculated phased array passband response.

12. A method of phased array passband calibration, the method comprising:
receiving, from a calibration probe coupled with an antenna array to transfer radio frequency (RF) energy, calibration probe measurements for a plurality of frequencies;
determining a calculated phased array passband response for a first incidence angle, based at least on the calibration probe measurements and a probe-to-far-field (FF) transform for the first incidence angle;
generating a tuning configuration for an equalization filter, based at least on the calculated phased array passband response; and
tuning the equalization filter, based at least on the tuning configuration.

13. The method of claim 12, further comprising filtering, with the equalization filter, at least one signal selected from the list consisting of:
an output of a receiver and an input to a transmitter.

14. The method of claim 12, wherein the calibration probe measurements comprise at least one measurement selected from the list consisting of:
RF energy transmitted by the antenna array to the calibration probe and RF energy transmitted by the calibration probe to the antenna array.

15. The method of claim 12, wherein the first incidence angle is a two-dimensional (2D) angle having azimuth and elevation components.

16. The method of claim 12, further comprising:
determining a calculated radiation pattern of a phased array antenna for each of the plurality of frequencies across a plurality of incidence angles including the first incidence angle, based at least on the calibration probe measurements and probe-to-FF transforms for the plurality of incidence angles; and
wherein determining the calculated phased array passband response for the first incidence angle comprises determining a frequency response across the calculated radiation patterns at the first incidence angle.

17. The method of claim 12, further comprising:
monitoring for a calibration trigger event selected from the list consisting of:
a timer event and a sensed environmental condition.

18. The method of claim 12, further comprising:
measuring, with a scanning probe, RF energy transmitted by the antenna array at each of the plurality of incidence angles, wherein the scanning probe is movable relative to the antenna array; and
generating the database of probe-to-FF transforms, based at least on performing a calculation with calibration probe measurements and scanning probe measurements.

19. The method of claim 12, wherein the tuning configuration renders a passband of the equalization filter into an inverse of the calculated phased array passband response.

20. A computer storage media having a computer readable program code embodied therein, the computer readable program code adapted to be executed to implement a method of phased array passband calibration, the method comprising:
receiving, from a calibration probe coupled with an antenna array to transfer radio frequency (RF) energy, calibration probe measurements for a plurality of frequencies;
determining a calculated phased array passband response for a first incidence angle, based at least on the calibration probe measurements and a probe-to-far-field (FF) transform for the first incidence angle;
generating a tuning configuration for an equalization filter, based at least on the calculated phased array passband response; and
tuning the equalization filter, based at least on the tuning configuration.

* * * * *